United States Patent
Kusano

(10) Patent No.: US 7,044,015 B2
(45) Date of Patent: May 16, 2006

(54) CONTROL APPARATUS OF AUTOMATIC TRANSMISSION WITH MANUAL MODE

(75) Inventor: Yoshimasa Kusano, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 114 days.

(21) Appl. No.: 10/895,347

(22) Filed: Jul. 21, 2004

(65) Prior Publication Data
US 2005/0022621 A1    Feb. 3, 2005

(30) Foreign Application Priority Data
Jul. 29, 2003    (JP) ............................. 2003-282094

(51) Int. Cl.
*F16H 59/00* (2006.01)
(52) U.S. Cl. ............................................ 74/335
(58) Field of Classification Search ............... 74/335, 74/473.18; 200/61.91
See application file for complete search history.

(56) References Cited

U.S. PATENT DOCUMENTS
6,012,352 A * 1/2000 Ishii et al. ............... 74/473.18

FOREIGN PATENT DOCUMENTS
JP       10-329568 A    12/1998

\* cited by examiner

*Primary Examiner*—Dirk Wright
(74) *Attorney, Agent, or Firm*—Foley & Lardner LLP

(57) ABSTRACT a mode change switch 3 which changes an automatic shift mode and a manual mode, an up-shift switch 4, and a down-shift switch 5 are provided. The mode change switch 3 outputs an output of the normal-open contact point P2 as a manual mode signal to a controller 1 in operating the manual change switch 3, while an output of the normal-closed contact point P4 is outputted to an input side of the up-shift switch 4 at non-operation thereof. The up-shift switch 4 and the down-shift switch 5 are provided with the normal-open contact points P12, P22 which output an up-shift signal commanding an up-shift or a down-shift signal commanding a down-shift in operating the switch, and the normal-closed contact points P14, P24 which output a monitor signal at non-operation thereof.

9 Claims, 7 Drawing Sheets

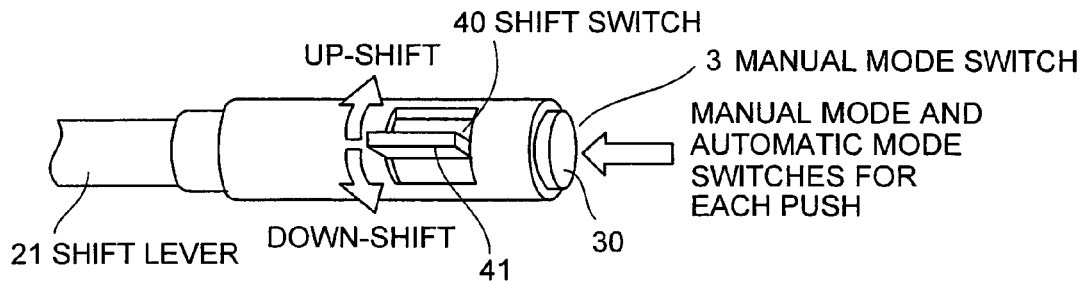
FIG. 5
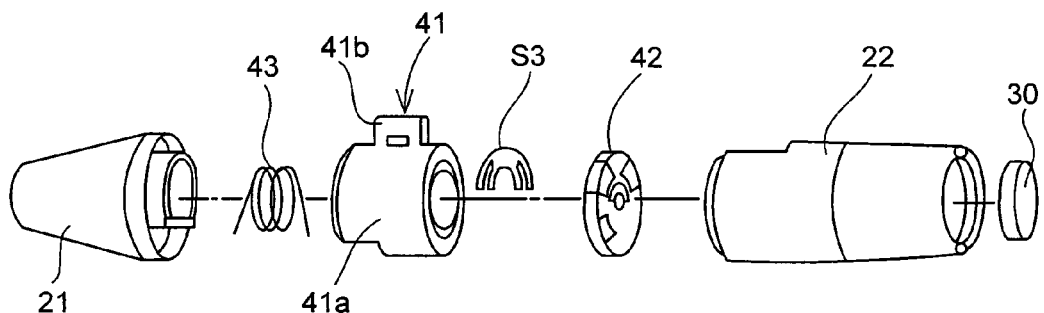
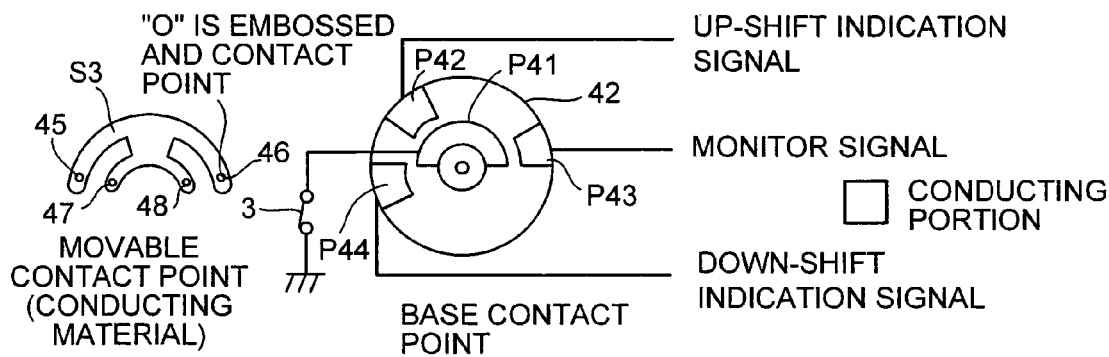
FIG. 6

CONTROL APPARATUS OF AUTOMATIC TRANSMISSION WITH MANUAL MODE

BACKGROUND OF THE INVENTION

1. Field of the Invention

The present invention relates to a control apparatus of an automatic transmission with a manual shift function for a vehicle.

2. Background Information

There is an earlier automatic transmission equipped with an automatic shift mode, and a manual shift mode where a gear shift is carried out by a manual shift operation. The automatic transmission performs mode selection by a manual mode switch and carries out down-shift or up-shift by a down-shift switch or an up-shift switch at a manual mode thereof.

Such automatic transmission executes commands based upon electrical signals. The automatic transmission, however, needs control circuits and control systems with high reliability since the automatic transmission is associated with vehicle drivability. And on the other hand, just in case failures in these electrical systems occur, it is very imperative to be able to detect the failures immediately.

In an apparatus disclosed in Japanese Patent Publication No. 10-329568-A a mode change switch is formed of a normal-open type switch, and an up-shift switch and a down-shift switch are formed of normal-closed type switches whereby breaking of wire at a manual mode or open failures of the switches can be detected.

SUMMARY OF THE INVENTION

In countries such as the United States it has recently been provided by law that in case deterioration of exhaust gas emissions due to vehicle failures possibly causes a bad impact on an environment, immediate detection of the vehicle failures should be notified to a driver by means of a display or the like and the bad impact on the environment should be minimized.

However, in the above earlier example, after the transmission is transferred to a manual mode by turning on the mode change switch, the failure of the up-shift switch or the down-shift switch can be detected and on the other hand, the failure of the mode change switch can not be detected. Accordingly in case the mode change switch is locked with the manual mode switch turning on, the shift mode does not change from the manual mode. Therefore, there is a case where although a driver intends to have changed the manual mode to the automatic shift mode by operating the manual mode switch, in fact the shift mode does not change from the manual mode, and yet in the event a low gear is then selected, a vehicle continues to run at a low gear, possibly providing a bad influence to an environment due to deterioration of the exhaust gas emissions.

And although failures of "off" in the up-shift switch and the down-shift switch can be detected, since it is impossible to detect the failure due to the these switches being locked with the switches still turning on, an appropriate selection of a gear shift can not be carried out.

Accordingly the present invention has an object of providing a control apparatus of an automatic transmission with a manual mode which certainly detects failures or disconnection of a switch associated with change of a manual mode or a manual shift operation.

A control apparatus of an automatic transmission with a manual mode according to the present invention comprises a mode change switch which commands change of an automatic shift mode and a manual mode, a manual shift command switch which commands an up-shift or a down-shift, and a control circuit which controls a shift operation of the automatic transmission based upon the up-shift command or the down-shift command from the manual shift command switch when the manual mode is commanded by the mode change switch. The mode change switch further includes a switch with a normal-closed contact point and a normal-open contact point and outputs as a manual mode signal an output from the normal-open contact point in operating the mode change switch, while an output from the normal-closed contact point is outputted to an input side of the manual shift command switch at non-operating of the mode change switch. The manual shift command switch includes a switch with a normal-open contact point for each of the up-shift and the down-shift and with a normal-closed contact point for each of the up-shift and the down-shift. An up-shift signal which commands an up-shift or a down-shift signal which commands a down-shift in operating the manual shift command switch is outputted to the control circuit from the normal-open contact point, and a monitor signal is outputted to the control circuit from the normal-closed contact point at non-operating of the manual shift command switch.

As a result, according to the present invention, as any trouble occurs in a mode change switch, a manual shift command switch, or circuits for performing a manual mode operation, other signals in addition to a monitor signal are outputted or the monitor signal is not outputted. Therefore, the control circuit can determine that failures occur based upon when a plurality of signal outputs are produced or any signal is not produced at all, thereby to accurately detect failures in the mode change switch, the manual shift command switch, or the circuits. Accordingly when occurrence of the failures is detected, for example, the shift mode is changed from the manual mode to the automatic shift mode or the occurrence of the failures is notified to a driver by the control circuit, thereby to be able to certainly prevent deterioration of fuel economy or exhaust gas emissions.

These and other objects, features, aspects and advantages of the present invention will be become apparent to those skilled in the art from the following detailed description, which, taken in conjunction with the annexed drawings, discloses a preferred embodiments of the present invention.

BRIEF EXPLANATION OF THE DRAWINGS

FIG. 5 is a perspective view showing a part of a shift lever equipped with a shift switch and a mode change switch of the second embodiment of the present invention.

FIG. 6 is an exploded perspective view of the shift switch of the second embodiment of the present invention.

DETAILED DESCRIPTION OF THE PREFERRED EMBODIMENTS OF THE INVENTION

Selected embodiments of the present invention will now be explained with reference to the drawings. It will be apparent to those skilled in the art from this disclosure that the following description of the embodiments of the present invention are provided for illustration only, and not for the purpose of limiting the invention as defined by the appended claims and their equivalents.

First Embodiment

A first embodiment according to the present invention will be explained with accompanying drawings.

Figure 1:
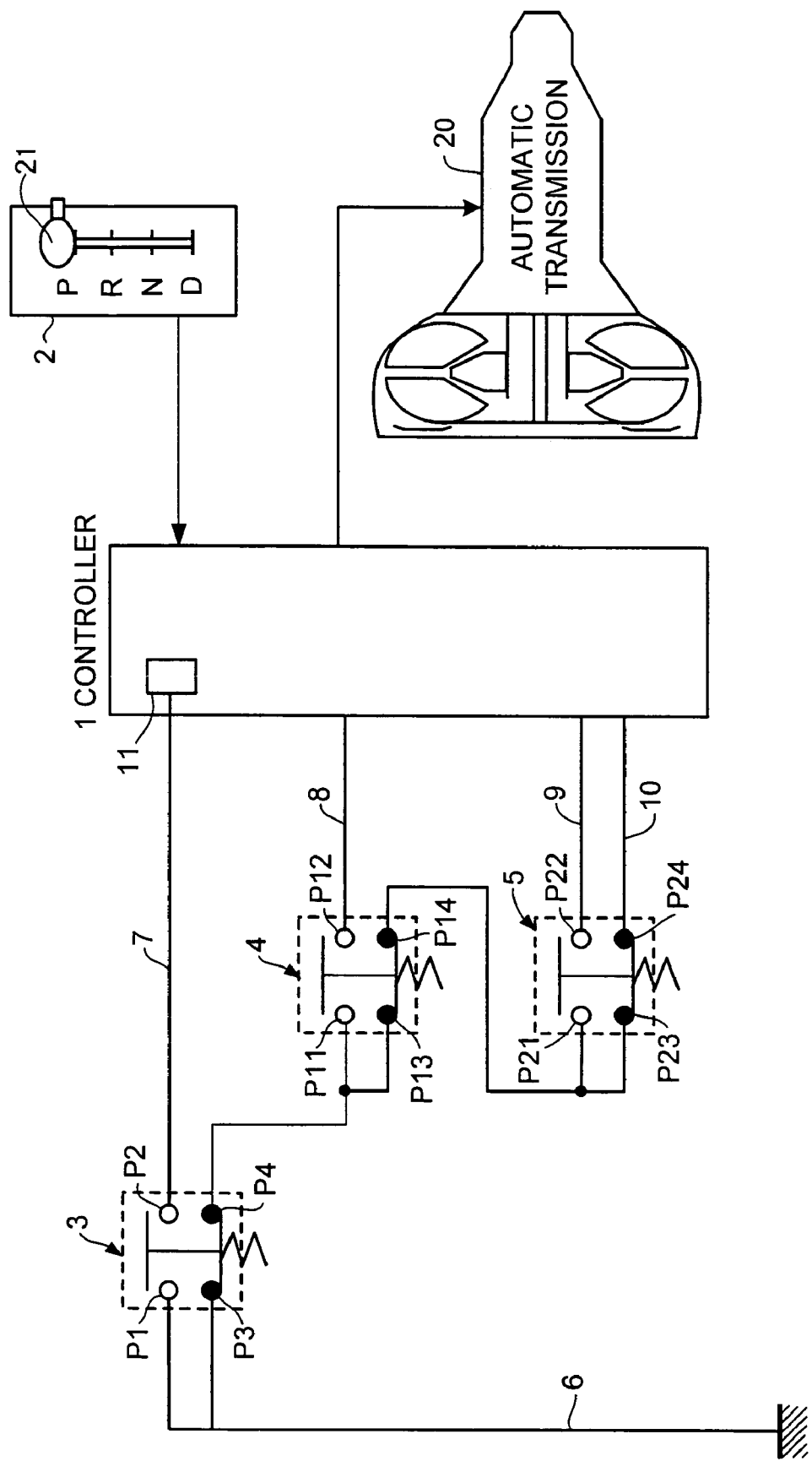
FIG. 1 is a schematic view of a control apparatus of an automatic transmission with a manual mode showing a first embodiment of the present invention.

FIG. 1 shows an automatic transmission to which the present invention is applied. The automatic transmission 20 is provided with an automatic shift mode where a gear ratio (or a gear shift position, the same hereinafter) is automatically changed in accordance with a driving condition of a vehicle and a manual mode where any gear ratio is selectable in accordance with an operation by a driver, wherein the gear ratio changes in accordance with commands from a controller 1.

The controller 1 is constructed mainly of a microcomputer and reads on signals from a selector switch 2 which outputs the signals corresponding to an operation of a shift lever 21, from a mode change switch 3, from an up-shift switch 4, and from a down-shift switch 5 which a driver operates, as well as reads on a vehicle speed from a vehicle speed sensor (not shown), an opening angle of a throttle valve (not shown) from a throttle opening angle sensor (not shown) or a depressed amount of an accelerator pedal. Then the controller 1 determines a gear ratio from a predetermined shift map (or a shift line) based upon these factors and commands the determined gear ratio to the automatic transmission 20.

Herein the shift map with the automatic shift mode and the shift map of the manual mode are respectively stored in a memory unit (not shown) of the controller 1 where the shift map for the automatic shift mode a gear ratio is preset in response to a vehicle speed or a depressed amount of the accelerator pedal, and in the shift map for the manual mode a preset gear shift position or a gear ratio in response to the preset gear shift position is set.

In the selector switch 2 of the shift lever 21 "D" range as the automatic shift mode, "R" range for driving a vehicle in reverse gear, "N" range for a neutral position, or "P" range for a parking position is selectable.

On the other hand, the mode change switch 3, the up-shift switch 4 and the down-shift switch 5 are arranged in a predetermined position within a driver's reach or the like (for example, in a steering wheel) and formed of momentary push switches. In addition, the momentary push switch is called unlock type without a lock mechanism and stays in a pushed position only for a period of time when the switch is pushed, and automatically returns back to an initial position when pushing the switch is stopped.

When the shift lever 21 is set to "D" range and thereafter, the shift mode is changed to a manual mode by pushing the mode change switch 3, the gear shift position is shifted up to a larger gear shift position (a smaller gear ratio) by pushing the up-shift switch 4 and is shifted down to a smaller gear shift position (a larger gear ratio) by pushing the down-shift switch 5. And yet gear shifting in the manual mode is performed from a present shift position to a neighboring shift position in.

Next, a manual mode circuit for change of the manual mode and a gear shift operation will be explained.

Figure 2:
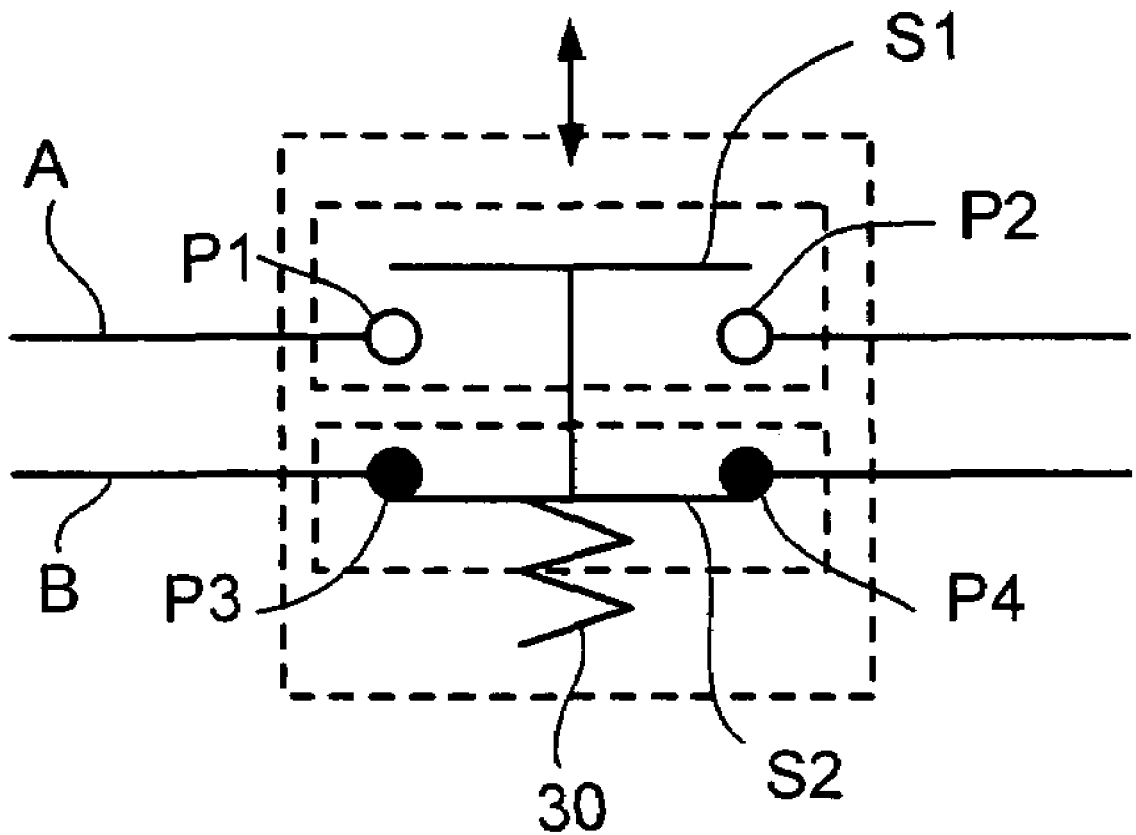
FIG. 2 is a circuit view of a switch of the first embodiment of the present invention.

The mode change switch 3, the up-shift switch 4, and the down-shift switch 5 are respectively formed of the same construction and by modifying a double-pole single-throw switch as shown in FIG. 2. Each switch includes a movable member S1 of a normal-open type to open/close a circuit A and a movable member S2 of a normal-close type to open/close a circuit B moving together with the movable member S1 where these movable members S1, S2 move in association with each other. That is, in a release state of the switch, a flexible member 30 is urged, to open contact points P1, P2, while contact points P3, P4 are closed by contacting with the movable member S2, to break the circuit A and conduct the circuit B. On the other hand, the contact points P1, P2 are closed by contacting with the movable member S1, while the contact points P3, P4 are opened, to conduct the circuit A and break the circuit B.

Namely each switch can perform on/off operations for each one of movable members S1 and S2 by normally opening one movable member S1 and by normally closing the other movable member S2.

The manual mode circuit as shown in FIG. 1 is formed of cascade connection using three switches identical to the switch shown in FIG. 2, wherein the mode change circuit 3 is arranged between a ground circuit 6 earthed to the ground and a manual mode signal line 7 connected to the controller 1, and the up-shift switch 4 is arranged between the mode change switch 3 and an up-shift signal line 8 connected to the controller 1, and the down-shift switch 5 is arranged between the up-shift switch 4 and a down-shift signal line 9 connected to the controller 1.

Each contact point P1, P3 of the mode change switch 3 is connected to the ground circuit 6 and the contact point P2 thereof is connected to the manual mode signal line 7 and the contact point P4 thereof is connected to the up-shift switch 4.

And in a release state of the mode change switch 3 the contact points P3, P4 are closed, to conduct the shift switch 4 to the ground circuit 6, while the contact points P1, P2 are opened. When the mode change switch 3 is pushed, the contact points P1, P2 are closed, to conduct the manual mode signal line 7 to the ground circuit 6, while the contact points P3, P4 are opened.

Each contact point P1, P3 of the mode change switch 3 is connected to the ground circuit 6 and the contact point P2 thereof is connected to the manual mode signal line 7 and the contact point P4 thereof is connected to the up-shift switch 4.

And in a release state of the mode change switch 3 the contact points P3, P4 are closed, to conduct the shift switch 4 to the ground circuit 6, while the contact points P1, P2 are opened, to break the manual mode signal line 7. When the mode change switch 3 is pushed, the contact points P1, P2 are closed, to conduct the manual mode signal line 7 to the ground circuit 6, while the contact points P3, P4 are opened, to break the up-shift switch 4 and the down-shift switch 5.

Each contact point P11, P13 of the up-shift switch 4 is connected to the contact point P4 of the mode change switch 3 and the contact point P12 thereof is connected to the up-shift signal line 8 and the contact point P14 thereof is connected to the down-shift switch 5.

And in a release state of the up-shift switch 4 the contact points P13, P14 are closed, to conduct the down-shift switch 5 to the ground circuit 6 through the contact point P4 of the mode change switch 3, while the contact points P11, P12 are opened, to break the up-shift signal line 8. When the up-shift switch 4 is pushed, the contact points P11, P12 are closed, to conduct the up-shift signal line 8 to the ground circuit 6 through the contact point P4 of the mode change switch 3, while the contact points P13, P14 are opened, to break the down-shift switch 5.

Each contact point P21, P23 of the down-shift switch 5 is connected to the contact point P14 of the up-shift switch 4 and the contact point P22 thereof is connected to the down-shift signal line 9 and the contact point P24 thereof is connected to the monitor signal line 10.

And in a release state of the down-shift switch 5 the contact points P23, P24 are closed, to conduct the monitor signal line 10 to the ground circuit 6 through the mode change switch 3 and up-shift switch 4, while the contact points P21, P22 are opened, to break the down-shift signal line 9.

When the down-shift switch 5 is pushed, the contact points P21, P22 are closed, to conduct the down-shift signal line 9 to the ground circuit 6 through the mode change switch 3 and the up-shit switch 4, while the contact points P23, p24 are opened, to break the monitor signal line 10.

Herein the manual mode signal line 7, the up-shift signal line 8, the down-shift signal line 9 and the monitor signal line 10 are respectively connected to the controller 1. Each switch 3–5 becomes "on" each time each switch is pushed and becomes "off" when released.

An output of each signal line is input to the controller 1. However, an output of the manual mode signal line 7 is input to a latch register 11 in the controller 1 once and each time an input from the signal line 7 becomes "on" (closed), a leading edge is detected and the controller 1 holds the state of a manual mode flag showing the manual mode state until the input from the signal line 7 is put "on" next.

The controller 1 determines that an up-shift indication signal, a down-shift indication signal, a monitor signal are put "on" in case outputs from the up-shift signal line 8, the down-shift signal line 9, and the monitor signal line 10 are received, and on the other hand, in the other cases these signals are put "off".

The monitor signal line 10 is associated with the monitor signal for detecting breaking of wire or switch locking and the controller 1 determines "on" state (conducting) or "off" state (breaking) of the line based upon an input level of the monitor signal line 10.

When the mode change switch 3 is pushed, the manual mode signal rises, thereby to input the manual mode signal line 7 to the latch register 11. The controller 1 detects the leading edge of the manual mode signal from the latch signal 11 to put the manual mode flag "on", thereby to carry out shift control of the manual mode.

Next when the mode change switch 3 is pushed and the input of the latch register 11 rises, the controller 11 reverses the manual mode flag from "on" to "off" and then carries out shift control of the automatic shift mode. Accordingly once the mode change switch 3 is pushed, the manual mode flag is put "on" and the shift mode is changed into the manual mode, and next when the mode change switch 3 is pushed, the manual mode flag is put "off", the manual mode is transferred into the automatic shift mode.

Next, operations of the above-described respective switches will be explained. When the automatic transmission 20 is in an automatic shift mode (when the shift lever is in "D" range), in case the manual mode switch 3 is pushed down, an output of the manual mode signal line 7 rises, to be input to the controller 1. The controller 11 changes the manual mode flag from "off" to "on" from the leading edge of the manual mode signal line 7 and transfers the shift mode from the automatic shift mode to the manual mode.

After transferred to the manual mode, when the up-shift switch 4 is pushed down by an up-shift operation, an output of the up-shift signal line 8 rises, to be input to the controller 1 and the up-shift indication signal is put "on", thereby to execute the up-shift.

When the down-shift switch 5 is pushed down by a down-shift operation likewise, an output of the down-shift signal line 9 rises, to be input to the controller 1 and the down-shift indication signal is put "on", thereby to execute the down-shift.

Since the respective switches 3–5 are connected in series, normal-closed contact points which are connected to the downstream side (a subsequent state) on operating the switch are opened. Then even if the switch in the downstream side (the subsequent stage) is operated, since the input from the switch in the upper stream side is open, the switching operation is cancelled. Namely it is possible by hardware to prevent double operations of switches and as a result, an operation error for switches can be prevented without fail.

Signal outputs to each switch operation are shown in Table 1.

TABLE 1

| | SWITCH OUTPUT SIGNAL | | | |
| --- | --- | --- | --- | --- |
| OPERATION | MANUAL MODE SIGNAL | UP-SHIFT INDICATION SIGNAL | DOWN-SHIFT INDICATION SIGNAL | MONITOR SIGNAL |
| 1 NON-OPERATION | OFF | OFF | OFF | ON |
| 2 MANUAL MODE CHANGE | ON | OFF | OFF | OFF |
| 3 UP-SHIFT | OFF | ON | OFF | OFF |
| 4 DOWN-SHIFT | OFF | OFF | ON | OFF |
| 5 MALFUNCTION | "OFF" FOR ALL OR MORE THAN TWO "ON" | | | |

Since in the embodiment, the respective switches 3–5 are connected in series and the outputs of the monitor signal line 10 are watched based upon its level, in case each switch is normal as shown in Table 1, only one output becomes "on" all the time in response to each operation including non-operation. Namely the controller 1 watches combinations of all signals and can determine failures of the circuits due to detecting more than one "on" input simultaneously or no input (off for all).

In particular, a normal-closed contact point of the down-shift switch 5 at the bottom stage out of the switches 3–5 arranged in series is connected to the controller 1 through the monitor signal line 10. Therefore, when the monitor signal is "on", if any other signal becomes "on" as shown at a malfunction condition in Table 1, since the normal-open side of any of the mode change switch 3, the up-shift switch 4, or the down-shift switch 5 is in an operating state, the normal-closed side of any of the switches 3–5 is determined to be locked based on when the monitor signal is "on" and the malfunction caused by the locking can be detected.

On the other hand, in case the outputs from all the signal lines 7–10 become "off", it indicates that the monitor signal line 10 is cut off from the ground circuit 6 and therefore, it is determined that breaking of wire occurs in any of the switches 3–5 or the circuits.

Next, a failure determination process carried out in the controller 1 will be explained with reference to FIG. 3. FIG. 3(A) is a flow chart with regard to a failure determination process, which is executed for every predetermined time (for example, a few seconds) and FIG. 3(B) shows a table for failure determination.

In Step S10 of FIG. 3(A), an output from each signal line is read on, and it is determined based upon a table of FIG. 3(B) whether or not each signal is in a normal pattern. Namely if any of each signal is "on", it is determined that each switch or circuit is in a normal state without locking or wire breaking and the process goes to a process of Step S14, wherein a control at a normal state for gear shifting in accordance with the operation of the up-shift switch 4 or the down-shift switch 5 is performed.

On the other hand, when all the signals are put "off", it is determined that it is a malfunction pattern as the wire breaking occurs as described above. And when two or more signals out of each signal are put "on", a malfunction pattern is determined where locking occurs in any of the switches. In case the malfunction is determined, the process goes to Step S12, wherein control at a malfunction condition is started.

At Step S12, time elapse is counted by a timer (not shown) and Step S11 and Step S12 are repeated until a value of the timer reaches a predetermined value (for example, a few seconds). And in case the malfunction pattern continues over a predetermined value (a predetermined time), the process goes to Step S13 based upon determining that the malfunction occurs in the switches or the circuits.

Namely since the malfunction is determined after the malfunction pattern continues over a predetermined time, a determination error caused by noises or the like can be prevented, to improve determination accuracy for malfunction.

Next, at Step S13 where the malfunction is determined, a manual mode is prohibited, as well as the manual mode flag is forcibly put "off" and then the shift mode goes to the automatic shift mode. A warning device (not shown) such as a warning lamp may be operated.

Accordingly, when the malfunction occurs in each switch 3–5 or circuit of the manual mode, a manual shift operation or a manual mode change becomes impossible and as a result, a driver has to drive a car at a present-selecting gear shift position in the above earlier device, thereby to possibly bring out deterioration of fuel economy.

However, according to the present invention, malfunctions of each switch 3–5 or circuit are accurately detected using the monitor signal and in case the malfunction is determined, the manual mode is forcibly lifted, to be transferred to the automatic shift mode. Accordingly as result of transfer to the shift control based upon driving conditions such as vehicle speeds, deterioration of a fuel economy or exhaust gas emissions even at a malfunction condition can be prevented without fail.

And an operation of the switch positioned in the downstream side (subsequent stage) is automatically cancelled when operating the switch positioned in the upstream side (former stage), due to cascade connection of the mode change switch 3, the up-shift switch 4 and the down-shift switch 5. Namely double operations are prevented, to properly prevent an operation error at a manual mode.

The above-described earlier device is a structure in which a mode change switch exclusive to the manual mode with an alternate (permanent) switch is used, but in the present invention, a switch in which a normal-open contact point and a normal-closed contact point operate in association with each other is used and this switch is a momentary type. Therefore, the manual mode change by a push type switch becomes possible, to enable compact arrangement of the switches and further, since an exclusive manual mode gate in the earlier device is unnecessary, layout freedom for the up-shift switch or the down-shift switch increases.

Figure 4:
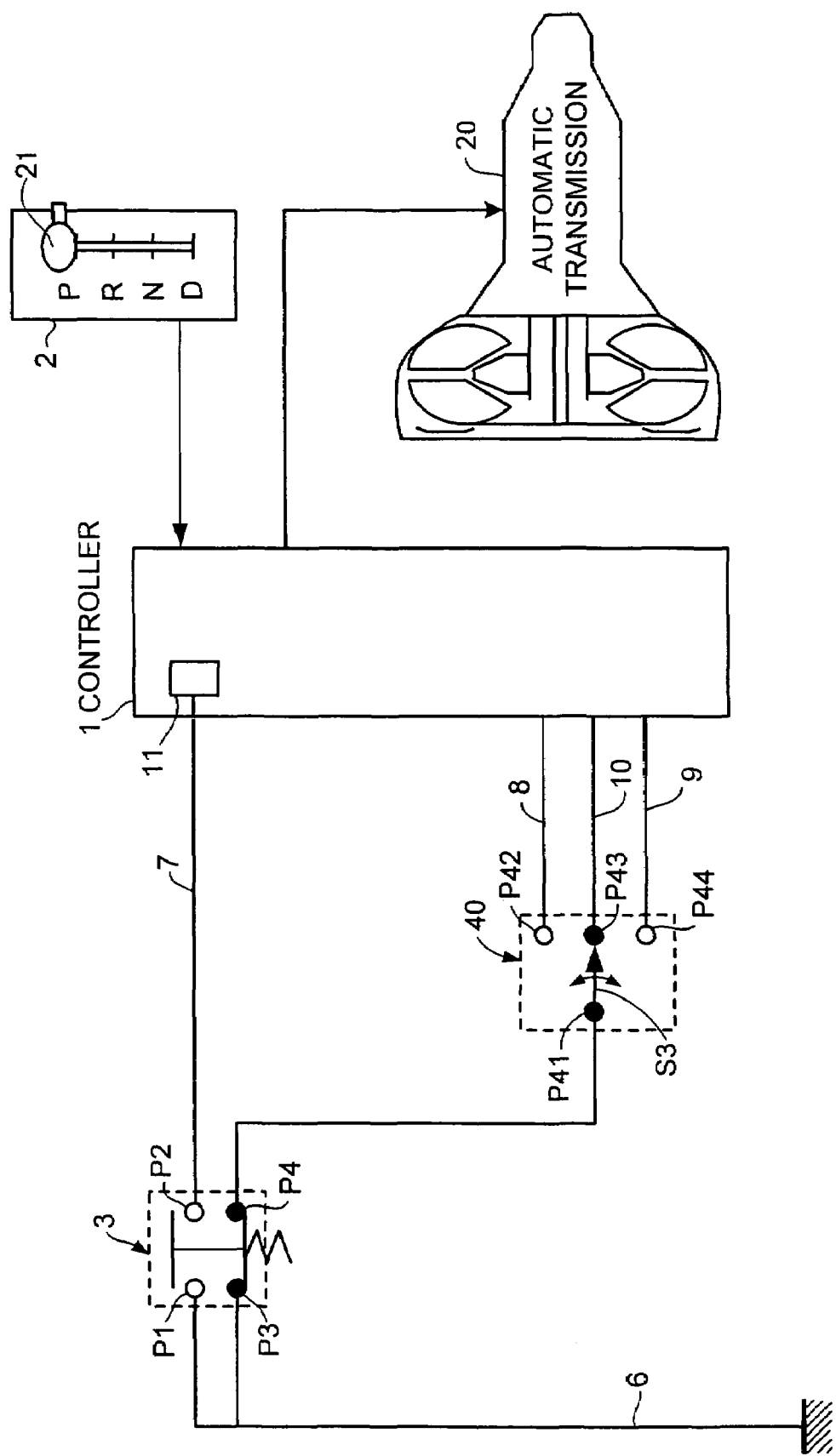
FIG. 4 is a schematic view of a control apparatus of an automatic transmission with a manual mode showing a second embodiment of the present invention.

FIG. 4 shows a second embodiment where the up-shift switch 4 and the down-shift switch 5 in the first embodiment are replaced by a shift switch 40 having three contact points for one circuit. The other components in the second embodiment are identical to those in the first embodiment.

The shift switch 40 includes a movable member S3 always conductive to a contact point P41, a normal-closed contact point P43 conductive to the contact point P41 at non-operation of the movable member S3, and contact points P42, P44 selectively conductive to the contact point P41 on operating the movable member S3 where one contact point is in a normal-closed condition and two contact points are in a normal-open condition. The contact point P41 always conductive to the movable member S3 is connected to the ground circuit 6 through the contact point P4 of the mode change switch 3.

The normal-closed contact point P43 is connected to the monitor signal line 10, the normal-open contact point P42 is connected to the up-shift signal line 8, and the normal-open contact point P44 is connected to the down-shift signal line 9.

And the shift switch 40 is designed to guarantee operations of the other two contact points just in case one contact point is out of order.

An input (contact point P1) of the normal-open contact point and an input (contact point P3) of the normal-closed contact point of the mode change switch 3 are connected to the ground circuit 6, and an output (contact point P2) of the normal-open contact point is connected through the manual mode signal line 7 to the controller 1 performing a manual mode change indication and on the other hand, an output (contact point P4) of the normal-closed contact point is connected to the an input (contact point P41) of the shift switch 40. Namely the shift switch 40 is cascade-connected to the downstream side of the mode change switch 3.

Next, an operation will be explained.

When the automatic transmission 20 is in an automatic shift mode and the mode change switch 3 is pushed down, "on" signal is input to the controller 1 through the latch register 11 from the manual mode signal line 7. The controller 1 which has received this "on" signal changes the manual mode flag from "off" to "on" and the shift control is transferred to the manual mode.

On the other hand, in case the movable member S3 of the shift switch 40 is operated at a manual mode and the normal-open contact point P42 becomes "on" by an up-shift operation, "on" signal of the shift switch is input to the controller 1 by the up-shift signal line 8, to execute an up-shift, and at a down-shift operation, the normal-open contact point P44 becomes "on" and the down-shift will be executed.

Since the mode change switch 3 and the switch 40 are connected in series, when the mode change switch 3 is pushed down, the normal-closed contact point P43 of the shift switch 40 connected to the downstream side is opened. Even if then the movable member S3 of the shift switch 40 is operated, the outputs from the upstream side are open, the operation of the movable member S3 is cancelled. And in the shift switch 40, only one contact point out of three contact points P42–P44 in the output side can be structually selected. Namely it is possible to prevent the simultaneous operations of the two or three switches mechanically. As well, signal outputs to each switch operation are the same as in Table 1.

Namely if each switch is normal, only one output with regard to each operation including non-operation becomes necessarily "on". Namely the controller 1 watches combinations of all signals and enables determinations of switch failures or wire breaking failures by detecting two or more "on" input signals or no input signal ("off" for all).

Figure 3:
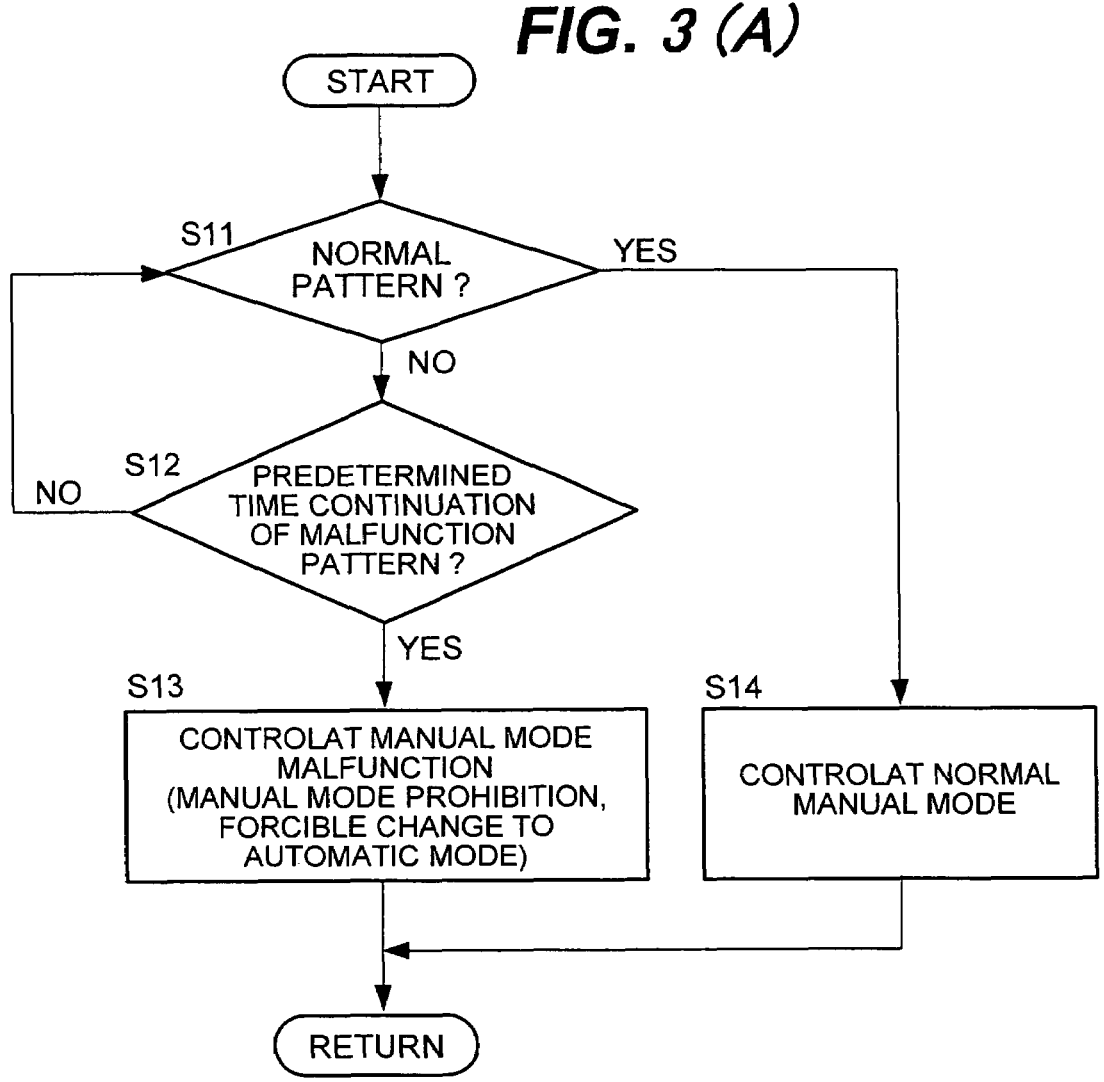
FIG. 3(A) shows a flow chart of a failure determination process executed in a controller of the first embodiment of the present invention.
FIG. 3(B) shows a table to determine a malfunction.

In the embodiment a failure determination process can be carried out in the same way as in FIG. 3 of the first embodiment. However, when malfunction in each switch 3, 40 or circuit at a manual mode occurs in the prior art, a manual shift operation or a manual mode change becomes impossible, and therefore, a driver has to drive a car at a present gear shift position, possibly causing deterioration of a fuel economy.

However, according to the present invention, in case failures of each switch 3, 40 or circuit are accurately detected using the monitor signal and as the failures are determined, the manual mode is forcibly lifted, to transfer to the automatic shift mode. As a result, the mode is transferred to the shift control based upon driving conditions such as vehicle speeds and it is possible to certainly prevent deterioration of a fuel economy and exhaust gas emissions even at a malfunction condition.

Next, FIG. 5–FIG. 10 show one example in which the shift switch 40 and the mode change switch 3 are applied to a column type shift lever.

In FIG. 5, the mode change switch 3 is located at an end of the shift lever 21. The movable member S1, S2 shown in FIG. 2 operate together by pushing an operation member 30 projected from the end of the shift lever 21, thereby to change on/off of the manual mode signal.

A lever 41 rotatable around an axis of the shift lever 21 within a predetermined range of an upward (first direction) or a downward direction (second direction) from a certain neutral position is located to a side face of the shift lever 21 and the up-shift signal line 8, the down-shift signal line 9, the monitor signal line 10 are put on/off by the movable member S3 secured to the lever 41.

FIG. 6 shows an exploded perspective view of the shift switch 40, and a switch casing 22 formed of a cylindrical material is attached to the end of the shift lever 21, and the mode change switch 3 and the shift switch 40 are received inside the switch casing 22. However, this figure shows an assembly state of the mode change switch 3, which is, therefore, not shown herein.

The shift switch 40 is mainly formed of the lever 41 rotatable around the axis of the shift lever 21, the movable member S3, a base contact point 42, and a flexible member 43.

The lever 41 is formed of a cylindrical portion 41a engageable to a shaft portion of the shift lever 21 and a convex portion 41b extending from the outer surface of the cylindrical portion 41a. The movable member S3 made of a conducting material is fixed to a side face of the cylindrical portion 41a and the base contact point 42 is located in a position opposite to the movable member S3. The movable member S3 rotates and slides on the base contact point 42 in response to an operation of the lever 41. The base contact point 42 is fixed inside the switch casing 22 and a notch portion through which the lever 41 passes is formed in the switch casing 22, to regulate rotating range of the lever 41.

And the flexible member 43 is interposed between the cylindrical portion 41a of the lever 41 and a side portion of the shift lever 21 to return the lever 41 back to a predetermined neutral position.

Next, the movable member S3 is formed of a plate member made of two circular materials having different diameters and four movable contact points 45–48 slidable with the base contact point 42 are formed to be projected in ends of each circular material.

On the other hand, the base contact point 42 is a circular plate material made of insulator in which the above-described contact points P41–P44 made of conducting material are arranged in a circumferential direction.

The contact point P41 is formed in a semi-circular shape in an inner surface of the circular base contact point 42 so as to always slide with the movable contact points 47, 48 formed in an inner surface of the movable member S3. The contact point P43 which is normal-closed at a neutral position of the lever 41 is formed in a periphery of the base contact point 42 in the right side of the figure and the contact points P42, P44 which are normal-open at the neutral position thereof are formed in a predetermined space in a periphery of the base contact point 42 in the left side of the figure.

Next, the movement of the movable member S3 in response to positions of the lever 41 and conducting states of each contact point will be described in detail with reference to FIG. 7–FIG. 10.

Figure 7:
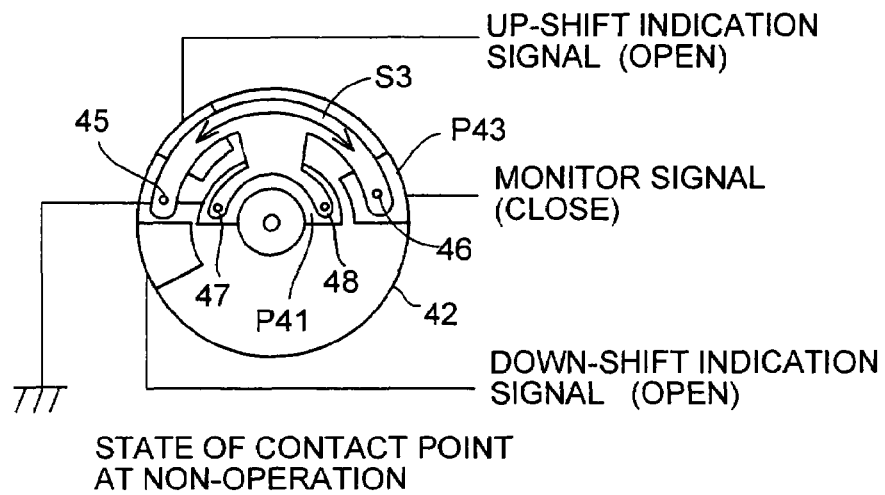
FIG. 7 is an explanation view showing a conducting state of the shift switch at a neutral position of the second embodiment of the present invention.

When the lever 41 is in a neutral position, as shown in FIG. 7, the movable contact points 47, 48 in the inner side of the movable member S3 contact the contact point P41 of the base contact point 42 and the movable contact point 46 in the outer side thereof contacts the contact point P43 connected to the monitor signal line 10, so that the contact points P41, P42 are conducted. Thereby, in a state where the mode change switch 3 is not pushed, the monitor signal line 10 is conducted to the ground circuit 6, to put the monitor signal "on". However, the movable contact point 45 is open between the contact points 42 and 44.

Figure 8:
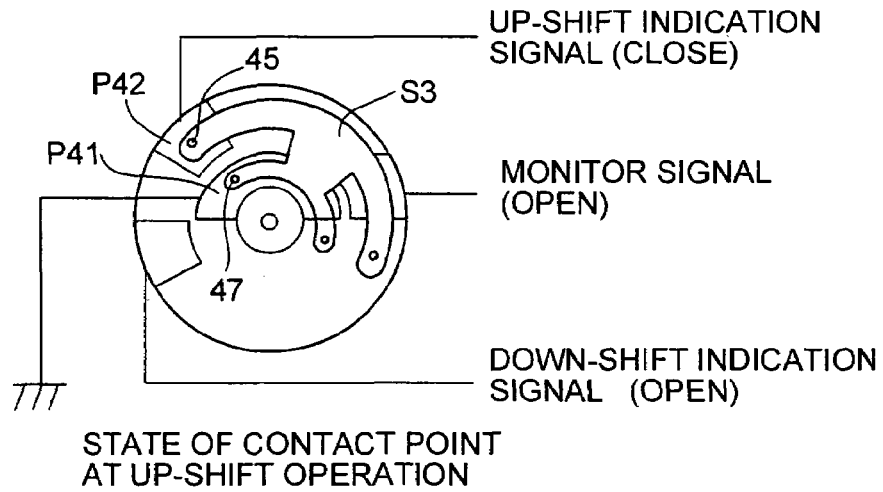
FIG. 8 is an explanation view showing a conducting state oOf the shift switch at an up-shift position of the second embodiment of the present invention.

On the other hand, as the lever 41 rotates upward in FIG. 5, the movable contact point 47 in the inner side of the movable member S3, as shown in FIG. 8, contacts the contact point P41 of the base contact point 42 and the movable contact point 45 in the outer side contacts the contact point P42 connected to the up-shift signal line 8, so that the contact point P41 and the contact point P42 are conducted. Thereby, in a state where the mode change switch 3 is not pushed, the up-shift signal line 8 is conducted to the ground circuit 6, to put the up-shift indication signal "on".

Figure 9:
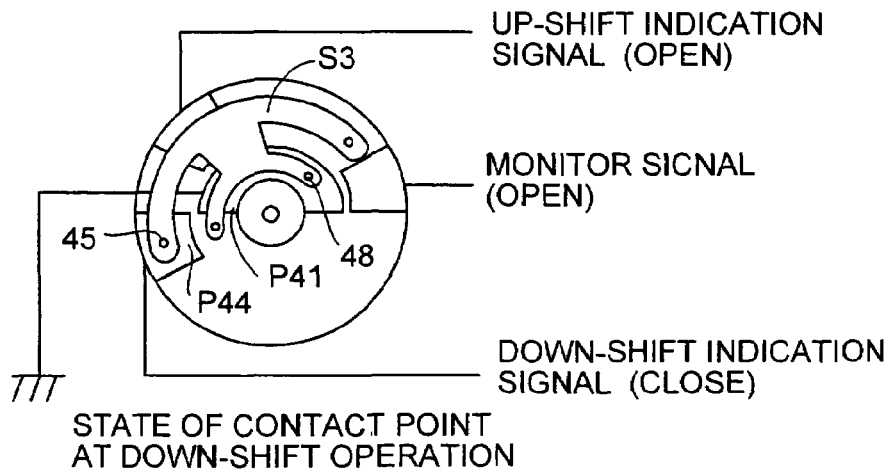
FIG. 9 is an explanation view showing a conducting state oOf the shift switch at a down-shift position of the second embodiment of the present invention.

In contrast, as the lever 41 rotates downward in FIG. 5, the movable contact point 48 in the inner side of the movable member S3, as shown in FIG. 9, contacts the contact point P41 of the base contact point 42 and the movable contact point 45 in the outer side contacts the contact point P44 connected to the down-shift signal line 9, so that the contact point P41 and the contact point P44 are conducted. Thereby, in a state where the mode change switch 3 is not pushed, the down-shift signal line 9 is conducted to the ground circuit 6, to put the down-shift indication signal "on".

The shift switch 40 becomes in any state of FIG. 7, FIG. 8 or FIG. 9 depending upon rotation of the lever 41, to put the up-shift indication signal or the down-shift indication signal on/off. Since the lever 41 is returned back to the neutral position on non-operation condition, the normal-closed contact points P43 and P41 become conducted, to put the monitor "on".

Figure 10:
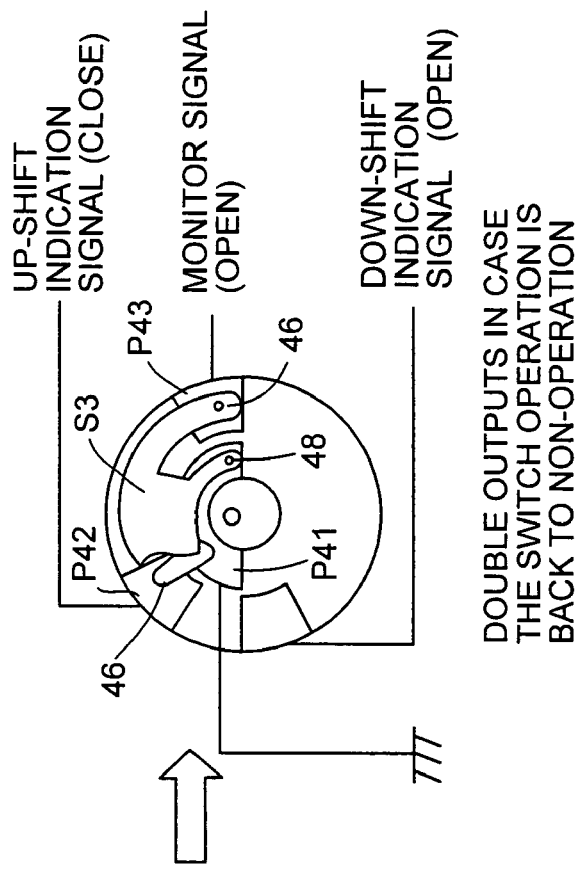
FIG. 10(A) is an explanation view showing a conducting state of the shift switch when it is locked at an up-shift position.
FIG. 10(B) is an explanation view showing a conducting state of the shift switch when it is locked at a neutral position.
Figure 10:
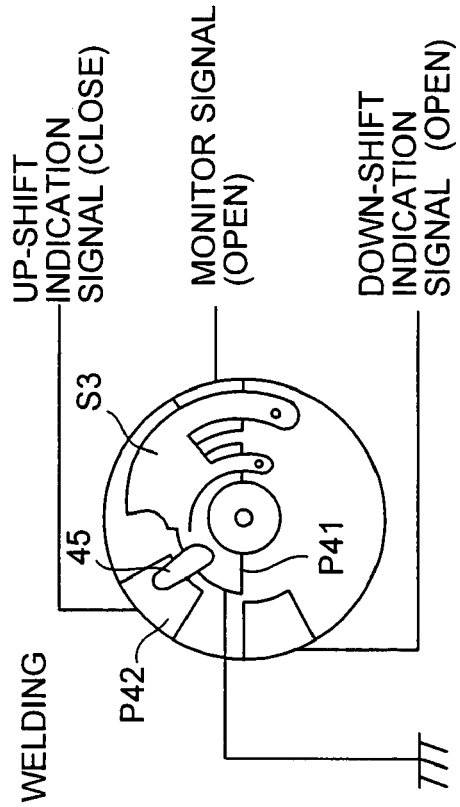

On the other hand, FIG. 10 shows the state where a part of the movable member S3 is fixed or welded.

For example, as shown in FIG. 8, when the up-shift operation is performed by rotating the lever 41 upward, the movable contact point 45 of the movable member S3 is locked as shown in FIG. 10(A) and as a result, a part of the movable contact point 45 and the movable member S3 is broken, to make the contact point P41 and P42 remain in the conducting state.

Thereafter, when a driver looses his or her hand from the lever 41, the movable member S3 is returned to a predetermined position by force of the flexible member 43 and then the movable contact point 48 contacts the contact point P41, and the movable contact point 46 contacts the contact point P43, to put the contact point P41 and P43 in a conducting state and in addition, since the part of the locked movable member S3 puts the contact point P42 and P41 in a conducting state, both the monitor signal line 10 and the up-shift signal line 8 are put "on".

Accordingly the controller 1 can determine that the malfunction occurs based upon the result that a plurality of the input signals are put "on".

As described above, the movable member S3 which slides with the fixed base contact point 42 is formed by connecting the outer arch with the inner arch, the contact point P41 which is the input side of the shift switch 40 is disposed in a predetermined range in the inner side of the base contact point 42, to always contact either one of the inner movable contact points 47, 48, and further the contact points P42, P43, P44 which are the output side of the shift switch 40 are arranged in the periphery of the base contact point 42 in the circumferential direction. Thereby when the part of the movable member S3 is locked and broken, the monitor signal is put "on" at a neutral position or the like by other movable contact points. Accordingly if the contact point P41 is conductive to the other contact point by locked, broken pieces, two or more output signals are put "on" and thereby the controller 1 can detect the malfunction of the shift switch 40 easily.

And as shown in FIG. 5, the mode change switch 3 and the shift switch 40 commanding the up/down shift are disposed in the end side of the shift lever 21, and as a result, shift operations including a manual mode can be performed by the shift lever 21 and in particular since an operation stroke amount of the lever 41 of the shift switch 40 is extremely smaller than of the earlier gate type, it is possible to promptly make an indication of the up-shift or the down-shift at a manual mode, thereby to improve operability of a transmission apparatus with a manual mode.

As well, in the above first embodiment, the mode change switch 3, the up-shift switch 4, and the down-shift switch 5 are disposed in a steering wheel independently from the shift lever 21, but as shown in the second embodiment, the switches 3–5 may be disposed in the shift lever 21 or may be disposed in any position within a driver's reach.

In the above embodiment, the manual mode is forcibly transferred to the automatic shift mode when the malfunction is detected, but occurrence of the malfunction may be notified to a driver by switching on a warning light or producing a warning sound when the malfunction is detected.

This application claims priority to Japanese Patent Application No. 2003-282094. The entire disclosure of Japanese Patent Application No. 2003-282094 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A control apparatus of an automatic transmission with a manual mode comprising:
    a mode change switch which commands change of an automatic shift mode and the manual mode;
    a manual shift command switch which commands an up-shift or a down-shift; and
    a control circuit which controls a shift operation of the automatic transmission based upon the up-shift command or the down-shift command from the manual shift command switch when the manual mode is commanded by the mode change switch, wherein
    the mode change switch further includes a switch with a normal-closed contact point and a normal-open contact point, the mode change switch outputting as a manual mode signal an output from the normal-open contact point to the control circuit in operating the mode change switch, while an output from the normal-closed contact point is outputted to an input side of the manual shift command switch in non-operating of the mode change switch, and
    the manual shift command switch includes a switch with a normal-open contact point for each of the up-shift and the down-shift and with a normal-closed contact point for each thereof, wherein an up-shift signal which commands the up-shift or a down-shift signal which commands the down-shift in operating the manual shift command switch is outputted to the control circuit from the normal-open contact point, and a monitor signal is outputted to the control circuit from the normal-closed contact point in non-operating of the manual shift command switch.

2. The control apparatus as set forth in claim 1, wherein the manual shift command switch-comprises:
    an up-shift switch which includes a normal-open contact point and a normal-closed contact point with an input side thereof shared, to output the up-shift signal from the normal-open contact point; and
    a down-shift switch which includes a normal-open contact point and a normal-closed contact point with an input side thereof shared, to output the down-shift signal from the normal-open contact point;

wherein the normal-closed contact points are cascade-connected, to output a monitor signal from the normal-closed contact point positioned at the bottom stage when the mode change switch, the up-shift switch, and the down-shift switch are not operated.

3. The control apparatus as set forth in claim 2, wherein an output of the normal-closed contact point in one of the up-shift switch and the down-shift switch which is in the front stage is input to the other which is in the rear stage, and an output of the normal-closed contact point which is in the rear stage is outputted as the monitor signal to the control circuit.

4. The control apparatus as set forth in claim 1, wherein the normal-open contact points and the normal-closed contact points of the mode change switch and the manual shift command switch operate in association with each other, and in the event that one of the normal-open contact points and the normal-closed contact points is out of order, on-and-off connection of the circuit at the other is possible.

5. The control apparatus as set forth in claim 1, wherein the manual shift command switch includes:
   a normal-closed contact point and a plurality of normal-open contact points with an input side thereof shared, and
   a movable member which puts one contact point of the normal-closed contact point and the normal-open contact points conducting to the input side, wherein the up-shift signal or the down-shift signal is outputted to the control circuit from one of the plurality of the normal-open contact points in operating the manual shift command switch and the monitor signal is outputted to the control circuit from the normal-closed contact point at non-operating thereof.

6. The control apparatus as set forth in claim 5, wherein the manual shift command switch includes one normal-closed contact point and two normal-open contact points, wherein the up-shift signal is outputted from one of the two normal-open contact points and the down-shift signal is outputted from the other thereof.

7. A control apparatus as set forth in claim 5, wherein the manual shift command signal includes an operation portion rotatable around an axis of the shift lever, wherein the normal-closed contact point is conducted at a neutral position of the operation portion and when the operation portion rotates from the neutral position to a first direction, one of the normal-open contact points is conducted and when the operation portion rotates from the neutral position to a second direction, the other is conducted.

8. The control apparatus as set forth in claim 1, wherein the control circuit includes a failure determination unit which determines a failure of the mode change switch or the manual shift command switch when two or more signals out of the monitor signal, the up-shift signal or the down-shift signal, and the manual mode signal are outputted or when any of the signals is not outputted.

9. The control apparatus as set forth in claim 8, wherein the control circuit forcibly changes from the manual mode to the automatic shift mode regardless of the output of the mode change switch based upon when the failure determination unit determines failures of the switches in a state where the manual change switch selects the manual mode.

* * * * *